J. H. BENNETT.
CANDY CUTTING MACHINE.
APPLICATION FILED OCT. 20, 1908.
958,717.
Patented May 24, 1910.
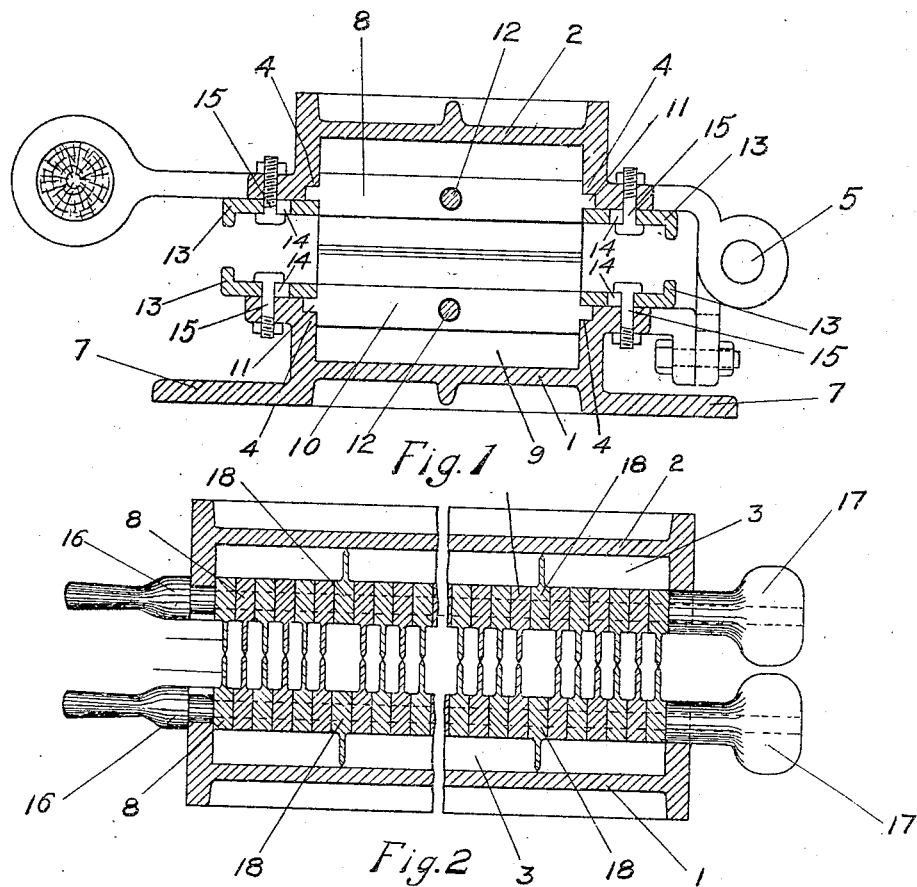
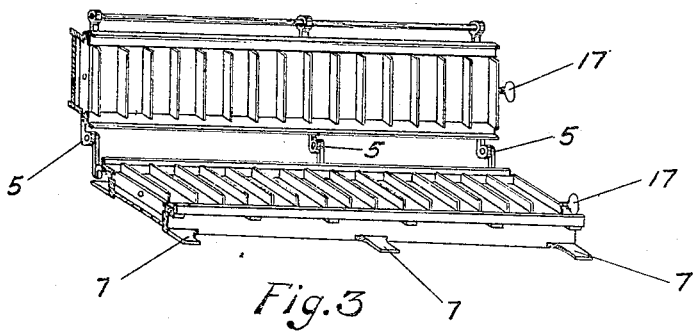
WITNESSES
William Lyman
Eleanor Conkley
INVENTOR
Joseph H Bennett
BY
Justin P Galland
ATTORNEY

UNITED STATES PATENT OFFICE.

JOSEPH H. BENNETT, OF NEW YORK, N. Y.

CANDY-CUTTING MACHINE.

958,717.  Specification of Letters Patent.  Patented May 24, 1910.

Application filed October 20, 1908. Serial No. 458,649.

*To all whom it may concern:*

Be it known that I, JOSEPH H. BENNETT, a citizen of the United States, and resident of the borough of Manhattan, New York city, in the county of New York and State of New York, have invented certain new and useful Improvements in Candy-Cutting Machines, of which the following is a specification.

My invention relates to improvements in candy cutting machines, and the object of my invention is to provide a simple and convenient device for cutting candy into strips.

My invention is illustrated in the accompanying drawings, in which—

Figure 1 is a lateral cross section of the device, Fig. 2 is a longitudinal cross section of the same, Fig. 3 is an isometric perspective of the device, with one end broken away.

Similar characters refer to similar parts throughout the several views.

In each of two counterpart frame members 1 and 2, I provide a longitudinal cut out section 3, and along the upper edges of each of these longitudinal cut out sections, I provide seats, 4, 4. These counterpart frame members 1 and 2 are hinged together on one side by bolts, and eyes 5, 5, 5. The lower frame member 2 may be provided with feet, 7, 7, 7 to insure stability. A series of counterpart cutting members 8, 8, 8 are provided, each having a body section 9 and a blade section 10 longitudinal thereof, and having lugs 11, 11 on each end to fit into the longitudinal seats 4, 4. Each of these cutting members 8, 8, 8 is provided with an aperture 12 intermediate of the ends, so that the aperture 12 in the cutting members 8, 8, 8 in each of the frame members will register when assembled. Upon each of the frame members 1 and 2, I provide along each side of the longitudinal cut out section 3, plates 13, 13, 13, 13 apertured at 14, 14 to receive the bolts 15, 15. These plates 13, 13 are secured upon the frame members 1 and 2 along the longitudinal sides of the cut out sections 3 and upon the lugs 11, 11 of the cutting members 8, 8, 8 to secure the cutting members in position. Tightening bolts 16, 16 are passed through the apertures 12, 12 in the cutting members 8, 8, 8 and are provided with screw threads and thumb screws 17, 17 whereby the cutting members are drawn and held tightly together.

The cutting members 8, 8, 8 are provided with blade sections 10 on one side only, so that when desired, a part of the cutting members 8, 8, 8 may be reversed to present a plane surface as shown on 18, 18.

Having thus described my invention, what I claim is:

1. In a device of the character described, the combination of a frame member provided with a longitudinal cut out section, having cut out seats along its upper longitudinal sides and a plurality of cutting members having lugs at each end to rest in the seats in the frame members, and comprising a blade section and a base section, whereby the blade section or base section of said cutting members may be interchangeably presented to the material to be cut, and retaining plates resting upon the lugs of the cutting members, substantially as shown and described.

2. In a device of the character described, the combination of two frame members each provided with a longitudinal cut out section each of which cut out sections having cut out seats along its longitudinal sides, the seat on the upper frame member being on the lower side and the seat on the lower frame member being on the upper side, a plurality of cutting members upon each of said frame members having lugs on each end to rest in the seats in the respective frame members and comprising a blade section and a base section, whereby the blade section or base section of said cutting members may be interchangeably presented to the material to be cut, and retaining plates resting upon the lugs of the cutting members, substantially as shown and described.

Signed at New York city in the county of New York and State of New York this 5th day of October A. D. 1908.

JOSEPH H. BENNETT.

Witnesses:
ANDREW FREED, Jr.,
SAMPSON H. SCHWARZ.